(12) United States Patent
Johansson et al.

(10) Patent No.: US 7,421,953 B2
(45) Date of Patent: Sep. 9, 2008

(54) COUPLING DEVICE IN OVERHEAD CONVEYOR SYSTEM

(75) Inventors: Hardy Johansson, Boras (SE); Palle Johansson, Boras (SE)

(73) Assignee: OCS Overhead Conveyor System AB, Boras (SE)

( * ) Notice: Subject to any disclaimer, the term of this patent is extended or adjusted under 35 U.S.C. 154(b) by 363 days.

(21) Appl. No.: 10/514,989

(22) PCT Filed: May 22, 2003

(86) PCT No.: PCT/SE03/00828

§ 371 (c)(1),
(2), (4) Date: Jun. 21, 2005

(87) PCT Pub. No.: WO03/097494

PCT Pub. Date: Nov. 27, 2003

(65) Prior Publication Data

US 2006/0016364 A1    Jan. 26, 2006

(30) Foreign Application Priority Data

May 22, 2002    (SE)    .................................. 0201550

(51) Int. Cl.
*B65G 35/00*    (2006.01)
(52) U.S. Cl. .................................... 104/166; 104/172.4
(58) Field of Classification Search ................. 104/166, 104/167, 249, 252, 172.4, 89; 105/30, 33
See application file for complete search history.

(56) References Cited

U.S. PATENT DOCUMENTS

| 3,044,416 | A | * | 7/1962 | Reibel et al. | ............. | 104/172.4 |
| 3,818,837 | A | * | 6/1974 | Jacoby et al. | ................ | 104/166 |
| 5,036,772 | A | | 8/1991 | Langenbacher et al. | | |
| 5,852,979 | A | * | 12/1998 | Desilets et al. | ........... | 104/172.4 |

FOREIGN PATENT DOCUMENTS

| DE | 199 17 806 A1 | 10/2000 |
| EP | 0 025 861 | 4/1981 |
| WO | WO 97/45348 | * 12/1997 |

* cited by examiner

*Primary Examiner*—Mark T Le
(74) *Attorney, Agent, or Firm*—Harness, Dickey & Pierce, P.L.C.

(57) ABSTRACT

A device for an overhead conveyor system of the type where a plurality of carriages (7) by contracting a rotating drive shaft (5) are propellable along a rail (2). The device comprises an operating arm (28) arranged in connection with a first carriage (7b) and adapted to actuate, by turning about an axis of rotation (26), a power transmission element (24) to disconnect the carriage from contact with the drive shaft, and an angled supporting surface (20) arranged in connection with a second carriage (7a). One end of the operating arm (28) is further adapted, when said carriages (7a, 7b) are moved towards each other, to contact said angled supporting surface (20) and be moved along the same, so that the operating arm (28) thus performs a turning motion and disconnects said first carriage (7b). According to the invention, the drive of the carriage will thus be interrupted as soon as its operating arm is contacted with the supporting surface of an anteriorly situated carriage. In this manner, carriages can be buffered.

13 Claims, 3 Drawing Sheets

COUPLING DEVICE IN OVERHEAD CONVEYOR SYSTEM

FIELD OF THE INVENTION

The present invention relates to a device for an overhead conveyor system of the type where a plurality of carriages by contacting a rotating drive shaft are propellable along a rail.

BACKGROUND ART

Such overhead conveyor systems have been known for a long time, and in this type of system it is sometimes desirable to be able to "buffer" carriages, i.e. to let a succession of carriages be stopped at a predetermined point along the rail. This may be convenient, for instance, in front of a working station or close to an elevator.

In prior-art systems, buffering is effected by extra drive sources or by different switching systems, but such solutions are expensive as well as inflexible.

It may also be the case that, depending on the type of drive, different carriages are driven at different speeds depending on different loads and/or differences in tolerances. It is then desirable for the drive of a rapidly driven carriage to cease when it "catches up with" a slowly driven carriage.

This may cause the drive of the quick carriage to slip, with increased wear and a reduced life of components included.

SUMMARY OF THE INVENTION

An object of the present invention therefore is to obviate or reduce the above problems, and provide a device for overhead conveyor systems which allows expedient disconnection of a carriage.

This and other objects are achieved by a device of the type stated by way of introduction, further comprising an operating arm arranged in connection with a first carriage and adapted to actuate by motion a power transmission element to disconnect the carriage from contact with the drive shaft, and an abutment arranged in connection with a second carriage, the operating arm being arranged, when said carriages are moved towards each other, to contact the abutment so that the operating arm thus performs a motion and disconnects said first carriage.

The invention is thus based on the knowledge that the force that arises in the contact between two carriages can be used to disconnect the carriage which is in a relatively faster motion. As a result, the above problems can be obviated in an efficient manner.

According to the invention, the drive of a carriage will be interrupted as soon as it is moved so close to another, anteriorly situated carriage that its operating arm is contacted with the abutment of this anteriorly situated carriage. In this way, carriages can be buffered by a first carriage being stopped (its drive is disconnected) and subsequent carriages then being allowed to drive into this carriage and thus be disconnected. As the first carriage is again released (its drive is connected), the abutment is separated from the operating arm and the force acting on the operating arm ceases. Thus also the drive of the next carriage is connected, etc.

In the same way, the risk is eliminated that a fast carriage that catches up with a slow carriage stands slipping since its drive is disconnected as soon as its comes sufficiently close to the slow carriage. As soon as the drive is disconnected, the slow carriage will possibly move away from the now disconnected carriage, whereby the disconnection ceases and the procedure is repeated.

According to a preferred embodiment, the operating arm is pivotally arranged, and the abutment consists of a supporting surface making an angle with the direction of propulsion of the carriage. The operating arm is further adapted, when said carriages are moved towards each other, to contact said angled supporting surface and be moved along the same, so that the operating arm thus performs a turning motion.

The utilisation of a turning motion of the operating arm offers an efficient way of realising the invention.

In this case, the operating arm can suitably be provided with a slide means, for instance a rotatable wheel, which with very low friction can roll on the supporting surface.

The power transmission element can be hingedly mounted in a joint a distance from an axis of rotation, said joint, by a motion of the operating arm, being adapted to be moved about the axis of rotation. This is an easy way of transferring the motion of the operating arm (whether translation, turning or rotation is involved) to translation of the power transmission element. In particular, the joint can be located on the operating arm, which then is turnable about the axis of rotation, but other constructions are also feasible.

According to a further preferred embodiment, the power transmission element is adapted to transfer, from a position located below said first carriage, a force to disconnect the carriage from the drive shaft. In this way the operating arm and also the supporting surface can be arranged at a level which is more convenient for their function. Moreover, they can be arranged closer to the load which is conveyed suspended from the respective carriages. According to this embodiment, it may be suitable for the power transmission element to be articulated in level with the carriage to handle any inclination of the load in relation to the carriage that may arise at the moment of contact.

According to another preferred embodiment, the overhead conveyor system is of the type where the drive shaft positioned above the rail, and the carriage comprises at least one drive wheel which is inclined relative to the direction of propulsion of the carriage and which, when contacting the drive shaft, drives the carriage along the rail. The power transmission element can then be adapted to transfer a downward force to the drive wheel, thereby disconnecting the drive wheel from the drive shaft.

According to yet another preferred embodiment, the carriages of the system are connected in pairs and jointly support a common load, said first carriage belonging to a first pair and said second carriage belonging to a second pair. This type of carrying in pairs is advantageous in systems intended for heavy loads (in the magnitude 100 kg). Carriages connected in pairs are also advantageous in connection with certain interruptions in drive, for instance in connection with certain types of switches.

In this case the operating arm can preferably be adapted to actuate a second power transmission element for disconnecting also the second carriage in said first pair. This ensures a complete disconnection of the entire load-carrying pair of carriages.

The second power transmission element can be hingedly mounted in a second joint a distance from a second axis of rotation, and in a link means can be adapted to transfer a turning motion about said first axis of rotation to a turning motion about said second axis of rotation, thereby entraining the second joint about the second axis of rotation. This is a simple way of effecting a synchronised disconnection of both carriages, by actuating the operating arm.

The second joint can be arranged in a spacer, which is pivotable about said second axis of rotation and to which one end of said link means is hingedly attached. Such a spacer simply ensures that the fulcrum is kept at a constant distance from the axis of rotation, and may consist of, for instance, a wheel or a link arm.

BRIEF DESCRIPTION OF THE DRAWINGS

FIG. 1a shows the system in a first, separated position, and FIG. 1b shows the system in a second, connected position.

DETAILED DESCRIPTION OF PREFERRED EMBODIMENTS

Figure 1A:
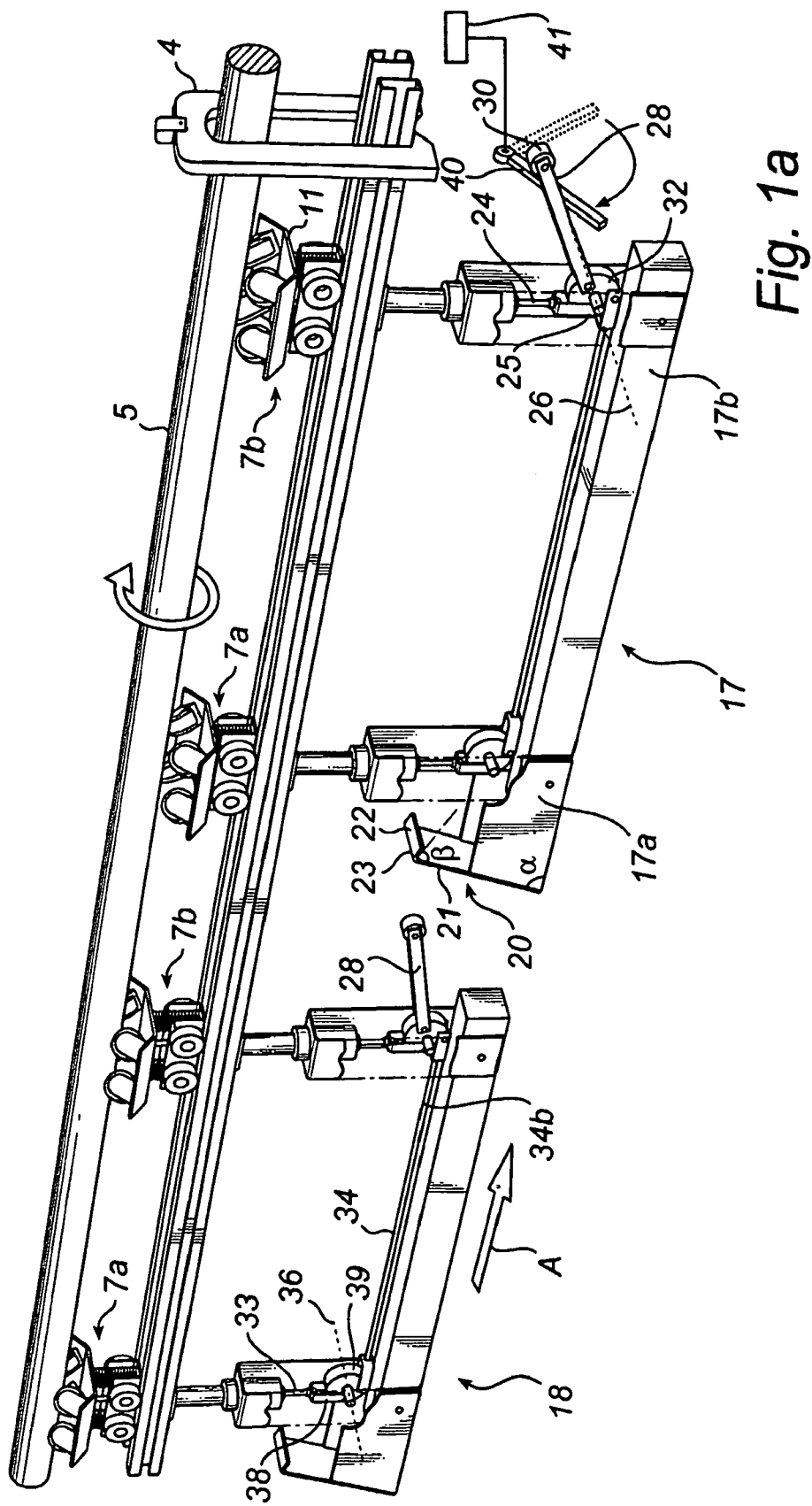
FIGS. 1a-b are perspective views of an overhead conveyor system provided with a device according to a first embodiment of the invention.
Figure 1B:
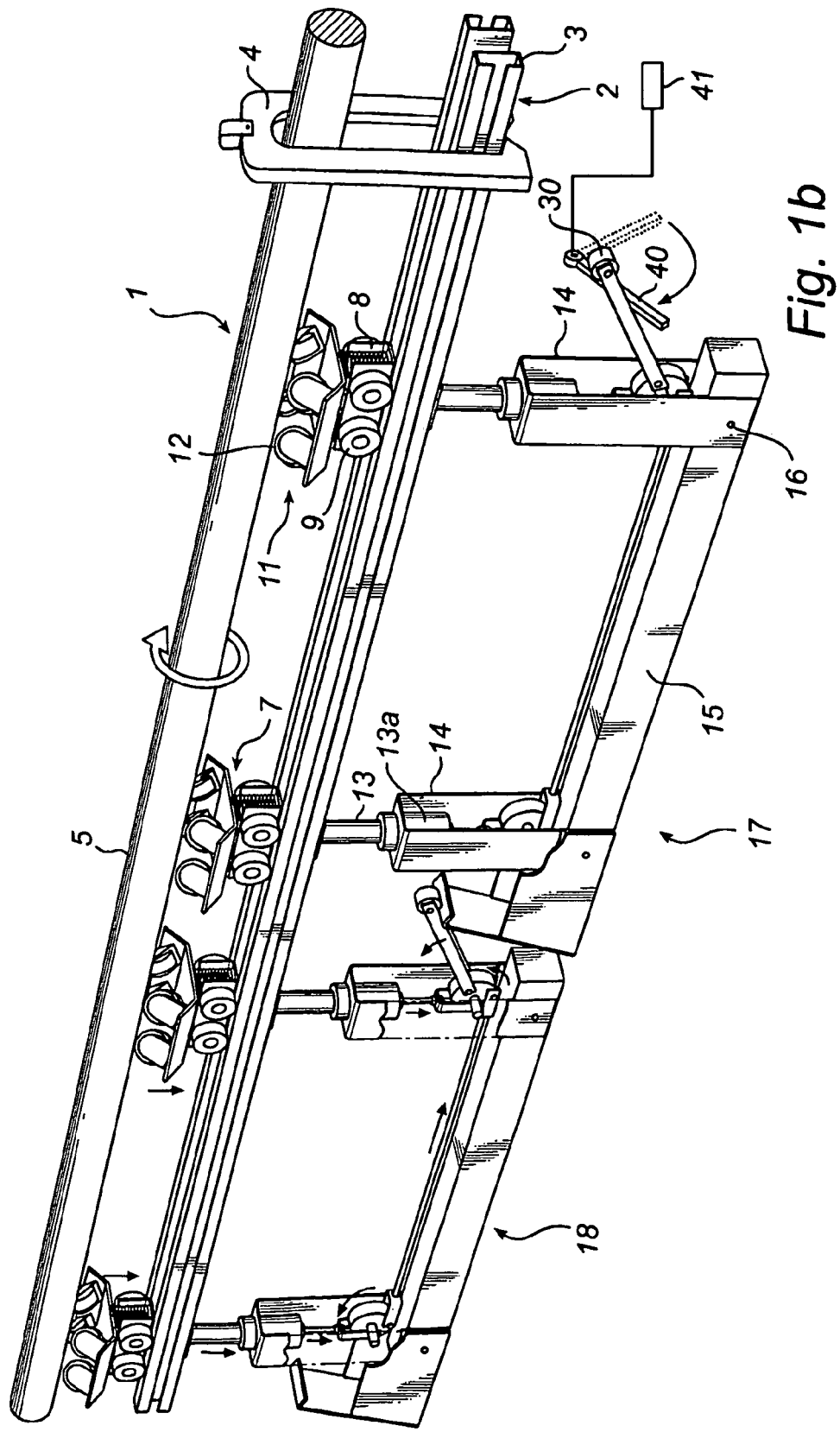

FIGS. 1a-b show an overhead conveyor system 1 of the type disclosed in WO 00/34161, in which the carriages are provided with a device according to a first embodiment of the invention.

The overhead conveyor system shown comprises a rail 2 which consists of two parallel rail elements 3, each rail element consisting of a hollow section of rectangular cross-section. The rail 2 is fixed by means of yokes 4 which are arranged spaced from each other on the outsides of the rail elements and which also are responsible for suspension of the overhead conveyor system 1. Above the rail 2 and extending along the same extends a rotatable drive shaft 5, which is drivable with the aid of means (not shown) adapted thereto, such as a belt connected to an electric motor. A plurality of carriages 7 are movable along the rail 2. The carriages 7 are positioned between the rail 2 and the drive shaft 5.

The carriages shown comprise a body 8 and four wheels 9. On the upper side of the carriage body 8, a drive unit 11 is arranged, consisting of at least one drive wheel 12, which is inclined relative to the longitudinal direction of the drive shaft and which by spring action is pressed towards the drive shaft.

The carriages shown in FIG. 1 have four drive wheels 12, which are arranged in pairs on each side of the drive shaft 5. All wheels are rotatable in suitably parallel planes, i.e. all drive wheels 12 are preferably inclined relative to the drive shaft at the same angle. It goes without saying that the number of drive wheels 12 on each carriage may vary and can be, for example, two or even one.

The dimensions of the drive unit 11 and the distance between the rail and the drive shaft are such that, when the carriage is positioned under the drive shaft 5, the drive wheels 12 are brought into contact with the circumferential surface of the drive shaft 5. During rotation of the drive shaft, the carriage is propelled along the rail.

A rod 13 is articulated to a first carriage 7, which rod 13 extends down between the rail elements 3. At its lower end 13a, the rod has a yoke 14, in which one end of a beam 15 is mounted by means of a through bolt 16. The other end of the beam is correspondingly connected to a second carriage 7. The construction consisting of the beam 15, the two rods 13 and the two carriages 7 constitutes a transport unit, which in FIGS. 1a-b is designated 17.

At the end 17a of the transport unit 17, which is the rear end relative to the direction of transport A, an abutment, here in the form of a supporting surface 20, is arranged, making an angle α in relation to the direction of transport A of the transport unit. The supporting surface 20 can further be bent so as to be divided into a plurality of portions angled in different ways. In the shown example, the supporting surface has two portions 21, 22, and the intermediate bend forms a crest 23. The supporting surface can be made of a piece of metal sheet, which is attached to the beam 15, for example, by welding. Of course, other materials may be used, such as plastic or wood, and attachment may comprise suitable fixing means such as bolts, screws, rivets etc.

At the end 17b of the transport unit 17, which is the front end relative to the direction of transport A, a power transmission element 24 is arranged adjacent to the drive unit 11 of the front carriage 7b. The power transmission element, which may be, for example, a rod, a wire, a belt, a chain etc, is adapted to transfer a force to the drive unit 11 and thus actuate this to lose contact with the drive shaft 5. The power transmission element is mounted in the drive unit in a suitable fashion, for instance by nuts on each side of drive unit.

In the shown example, the power transmission element is a rod extending downwards from the drive unit 11. Its extension thus coincides with the rod 13 which for this reason can be hollow, for instance in the form of a tube so that the rod 24 extends therein. The tube 13 ends at the point where it is attached to the yoke 14 while the rod 24 continues to a hinged mounting 25 below this point. If the tube 13 is articulated to the carriage 7b, which sometimes is advantageous, it may further be convenient for the rod 24 to be articulated on a level with the attachment of the tube 13 to the carriage, thereby preventing tension in the rod 24.

Moreover, an operating arm 28 turnable about an axis of rotation 26 is arranged in the yoke 14, i.e. between the beam 15 and the lower end 13a of the tubular rod 13. The arm 28 is adapted to transfer a turning motion to a motion of the rod 24. This means that a turning of the operating arm 28 causes the rod 24 to bring the drive unit 11 out of contact with the drive shaft 5.

The operating arm is further designed to slide, when being brought into contact with the supporting surface 21, along the same and thus be turned about the axis of rotation 26. To this end, the operating arm 28 can have a slide means 30, for instance a wheel of plastic or rubber, arranged at its free end, thereby facilitating a relative motion between the supporting surface 21 and the operating arm 28. Alternatively, the supporting surface can be provided with some kind of slide means.

Figure 2:
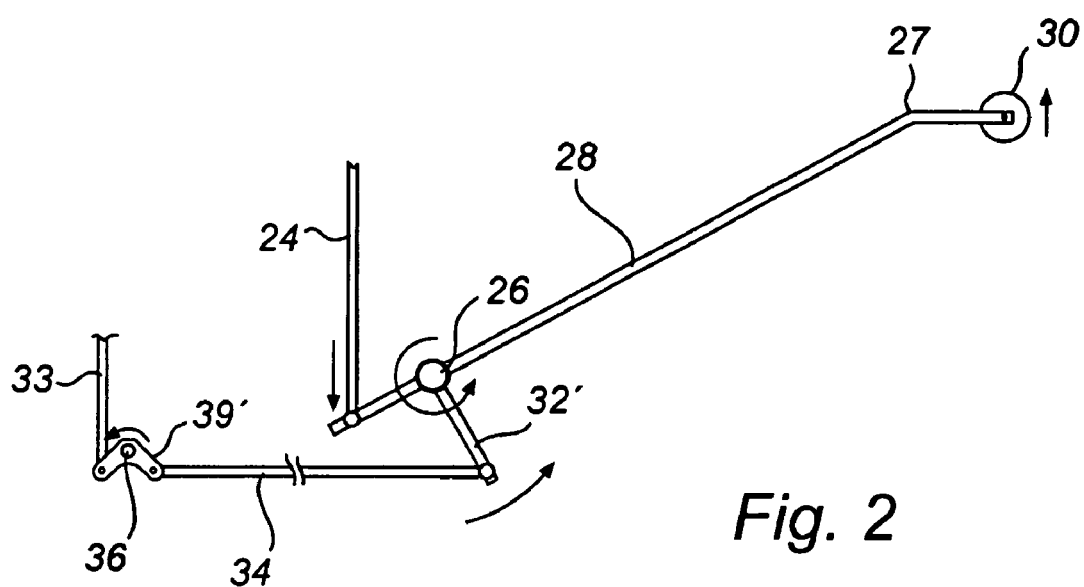
FIG. 2 shows an operating arm according to an alternative embodiment of the invention.

In the shown example, the operating arm 28 is arranged in a spacer 32, here in the form of a wheel, which has the hinged attachment 25 to which the rod 24 is attached. When the spacer 32 is caused to turn about the axis of rotation 26 by the operating arm 28, the attachment 25 will be moved, thereby actuating the rod 24 upwards or downwards. Alternatively, the operating arm can be designed as shown in FIG. 2, the power transmission element 24 being attached directly to the operating arm 28.

When a transport unit 17 with two carriages 7a, 7b is used, as is the case in FIGS. 1a-b, it is suitable to arrange a power transmission element 33 also in connection with the drive unit 11 of the second carriage 7a. The construction can be identical with the one described above, except that no operating arm is necessary. Instead a link arm 34 can be adapted to transfer a turning motion about the first front axis of rotation, to a turning motion about a second rear axis of rotation 36, thereby actuating a second hinged attachment 38, to which the power transmission element 33 is attached.

In the shown example, the rear power transmission element 33 is attached to a spacer 39, here in the form of a wheel, to which also one end 34a of a longitudinal rod 34 is attached. The rod 34 can alternatively be a wire, a belt, a chain etc. The other end 34b of the rod 34 is correspondingly attached to the front spacer 32, thereby coordinating their motions.

The spacers 32, 39 can assume a plurality of alternative shapes. As shown in FIG. 2, for instance the spacer 32 may consist of a protruding element 32' extending from the operating arm, and the spacer 29 may consist of an angular element 39'.

To obtain the desired motion pattern, the two vertical rods 24, 33 are in the shown example attached to the corresponding point on both wheels 32, 39, and also both ends of the longitudinal rod 34 are attached to the corresponding points on the two wheels. The wheels 32, 39 are thus intended to describe identical motions. If the operating arm 28, which in the shown example is adapted to perform an upward turning in disconnection, the vertical rods 24, 33 are also suitably attached behind the respective axes of rotation, seen in the direction of transport A.

The function of the device will be described in the following.

When the free end of the operating arm 28 is moved upwards, the front and the rear wheels 32, 39 are turned, their motions being coordinated by the longitudinal rod 34, about the respective axes of rotation 26, 36. The vertical rods will thus be pulled downwards and entrain the drive unit 11 of each carriage against the action of the spring load which urges the drive unit towards the drive shaft 5. Thus each drive unit 11 is separated from the drive shaft 5 and the drive of the carriage ceases. This motion pattern is indicated by arrows in connection with the transport unit 18 in FIG. 1b.

This offers an efficient way of disconnecting a transport unit 17 by its operating arm 28 being caused to disconnect the carriage, by being actuated from outside. Such actuation from outside can be generated by a vertically movable abutment 40, which at a given moment is activated and raises the operating arm 28, thereby disconnecting the carriage.

A subsequent transport unit 18, which of course is still propelled along the rail 2, will now approach the disconnected transport unit 17 (see FIG. 1a), its operating arm 28 being brought into contact with the supporting surface 20 of the immobile transport unit. The slide means of the operating arm 28 will then be caused to slide along the first portion 21 of the supporting surface 20, and over the crest 23, so as to finally take an upwardly pivoted final position. Thus, disconnection also of the second transport unit 18 will be accomplished (see FIG. 1b). The procedure will be repeated for each transport unit which "drives into" the immobile transport units.

The angle α is suitably determined by a person skilled in the art based on the conditions in the individual application, the purpose being to achieve sufficient turning of the operating arm 28, without the resistance in the direction of motion being too great. In the shown example, the angle α is about 80 degrees, but there may be variations in the range 0-90 degrees.

Furthermore the operating arm can have a bend 27 as shown in FIG. 2, if this is considered to improve the cooperation between operating arm and supporting surface. Such a bend causes improved locking in the final position, but at the same time the angular deflection of the operating arm will be deteriorated.

As the abutment 40 is being lowered, the operating arm will return to the resting position (FIG. 1a) caused by the spring action of the drive units 11, and the drive units are again brought into contact with the drive shaft 5. As soon as the first stopped transport unit 17 is in this way released, the operating arm 28 of the next transport unit 18 will slide along the supporting surface 20 of the first transport unit 17 and be released from the same, and thus also the drive units 11 of this unit 18 will return to an active position in contact with the drive shaft 5.

It is here important to adjust the angle β of the bent portion 32, as well as a possible bend 27 of the operating arm 28, so that the operating arm is not kept too firmly in the final position. If stronger locking in the final position should be desirable for some reason or another, some kind of mechanical stop (not shown) can be arranged to retain a subsequent transport unit 18 when a transport unit 17 is released.

The abutment 40 can in this way be used to release one or more carriages at a time, at a frequency which is suitable for subsequent operations, elevator, etc. The abutment 40 can be controlled by appropriate sensors 41 to be raised and lowered at the right moment in relation to the passing carriages.

It will be appreciated that a number of variations of the above embodiments are feasible within the scope of the appended claims.

What has been described above as an operating arm can, for instance, be designed as a plurality of interconnected parts, if this is considered advantageous.

Moreover, a large number of alternative motion patterns are conceivable between the parts of the device. For instance, the operating arm can be adapted to perform a translational motion when contacting the abutment which then does not have to be angled. If such an operating arm is hingedly mounted at the upper side of the wheel 32, the remaining construction may fundamentally be left unchanged. Alternatively, a horizontal translational motion can be transferred to a vertical motion of the rods 24, 33 by means of a body with wedge-shaped surfaces on which the ends of the rods may slide. The operating arm can also be adapted to perform a helical motion in the direction of transport, in which case it would be possible to arrange the rods 24, 33 on a longitudinal turnable shaft. A helical motion of the operating arm then causes a turning of this longitudinal shaft and, thus, a translation of the rods.

The link means 34, which is described above as a rod, may consist of a chain, while the wheels 32, 39 then suitably are formed as gear wheels.

Even if the above described embodiment is implemented in a system of transport units 17, 18, which each have two carriages 7a, 7b, the invention can also be used in a single carriage system. Then the longitudinal rod 34 is not necessary, and an operating arm and a supporting surface can be arranged in connection with one and the same carriage. For example, the operating arm 28 and the supporting surface 20 can be arranged on opposite sides of a rod 34 which extends between the carriage and a load supported by the carriage.

The invention claimed is:

1. A device for an overhead conveyor system, comprising:
   a rail,
   a rotatable drive shaft suspended above the rail,
   a plurality of carriages movable along the rail by at least one drive wheel brought into contact with the drive shaft via a spring action,
   an operating arm arranged in connection with a first carriage and adapted to actuate by moving a power transmission element to disconnect the first carriage from contacting the drive shaft, and
   an abutment arranged in connection with a second carriage, wherein the operating arm is arranged to contact the abutment so that the operating arm moves and disconnects the first carriage, when the carriages move toward each other.

2. The device as claimed in claim 1, wherein the operating arm is pivotally arranged, and the abutment includes a supporting surface making an angle with a direction of propulsion of the carriage, and an end of the operating arm is adapted, when the carriages move toward each other, to contact the angled supporting surface and be moved along the same, so that the operating arm performs a turning motion.

3. The device as claimed in claim 2, wherein the end of the operating arm includes a slidable element adapted to facilitate moving along the supporting surface.

4. The device as claimed in claim 3, wherein the slidable element is a rotatable wheel.

5. The device as claimed in claim 1, wherein the power transmission element is hingedly mounted in a joint, the joint, being adapted to be moved about a first axis of rotation by a motion of the operating arm.

6. The device as claimed in claim 5, wherein the joint is located on the operating arm.

7. The device as claimed claim 1, wherein the power transmission element is adapted to transfer, from a position located below the first carriage, a force to disconnect the carriage from the drive shaft.

8. The device as claimed in claim 7, wherein the power transmission element is articulated in level with the carriage.

9. The device as claimed in claim 1, wherein the at least one drive wheel is inclined relative to a direction of propulsion of the carriage and which, when contacting the drive shaft, drives the carriage along the rail, and the power transmission element being adapted to transfer a downward force to the at least one drive wheel, thereby disconnecting the at least one drive wheel from the drive shaft.

10. The device as claimed in claim 5, wherein the carriages are interconnected in pairs and jointly support a common load, the first carriage belonging to a first pair and the second carriage belonging to a second pair.

11. The device as claimed in claim 10, wherein the operating arm is further adapted to actuate a second power transmission element for disconnecting the second carriage in the first pair.

12. The device as claimed in claim 11, wherein the second power transmission element is hingedly mounted in a second joint and adapted to move about a distance from a second axis of rotation, and a linking element is adapted to transfer a turning motion of the first joint about the first axis of rotation to a turning motion of the second joint about the second axis of rotation.

13. The device as claimed in claim 12, wherein the second joint is arranged in a spacer, which is pivotable about the second axis of rotation and to which one end of the linking element is hingedly attached.

* * * * *